J. YEMIKER.
COLLAPSIBLE CORE.
APPLICATION FILED AUG. 27, 1913.
1,107,398.
Patented Aug. 18, 1914.
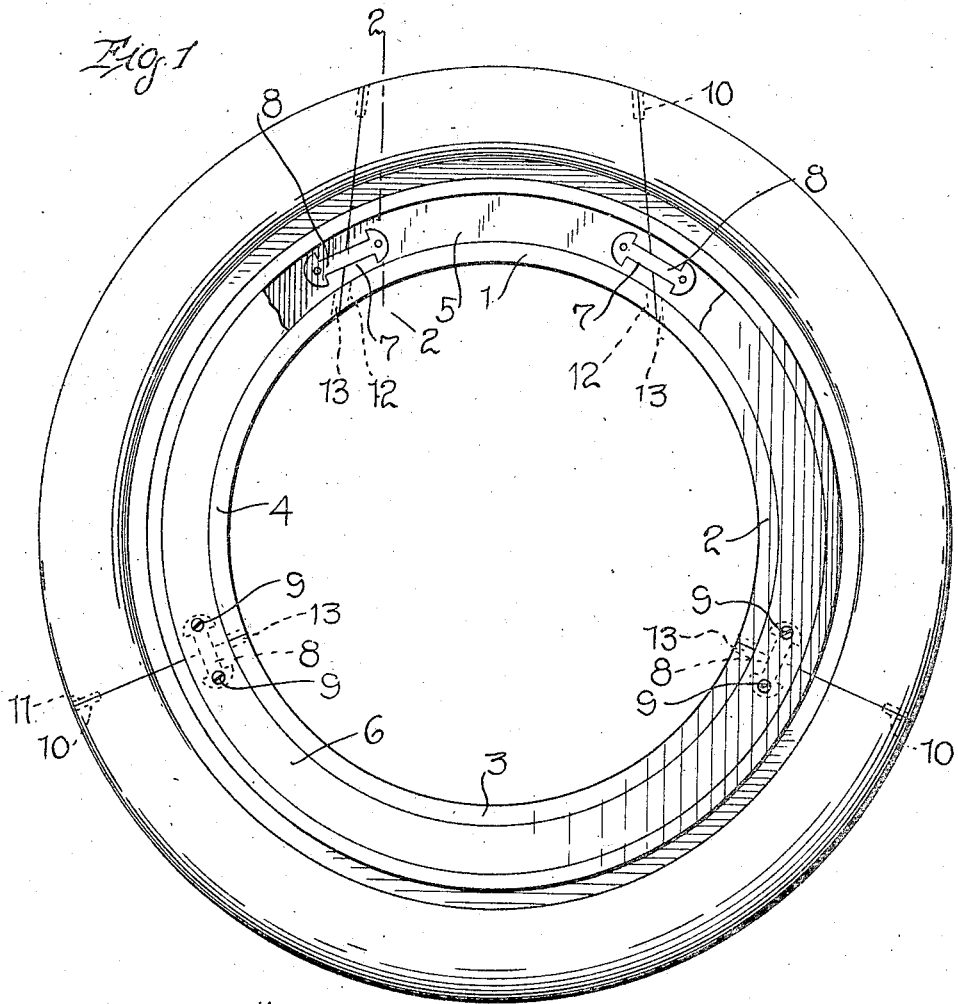
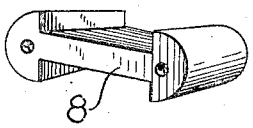
Witnesses
Robert M. Sutphen.
A. I. Hind.
Inventor
J. YEMIKER
By Watson E. Coleman
Attorney

UNITED STATES PATENT OFFICE.

JOHN YEMIKER, OF AKRON, OHIO.

COLLAPSIBLE CORE.

1,107,398.

Specification of Letters Patent. Patented Aug. 18, 1914.

Application filed August 27, 1913. Serial No. 786,989.

*To all whom it may concern:*

Be it known that I, JOHN YEMIKER, a citizen of the United States, residing at Akron, in the county of Summit and State of Ohio, have invented certain new and useful Improvements in Collapsible Cores, of which the following is a specification, reference being had to the accompanying drawings.

This invention comprehends certain new and useful improvements in collapsible cores or mandrels designed particularly for use in molding rubber tires or analogous articles.

The invention has for its primary object a core, the parts of which are so constructed and arranged that the necessity of employing contracting rings, mandrels, or bolts for drawing the sections of the core together and holding them in assembled relation is entirely eliminated, whereby the core will possess to a considerable degree, the characteristics of simplicity, durability, and efficiency in operation, as well as reducing to the minimum, the time required for assembling and dissassembling the sections of the core. And the invention also aims to generally improve devices of this class and construct the parts in such manner that when assembled, they will serve to securely retain one another in proper position.

A still further object of this invention is to provide a device of this character which will be of extremely simple construction, as well as highly efficient in use, thereby rendering the devices commercially desirable.

With the above and other objects in view as will more fully appear as the description proceeds, the invention consists in certain constructions, arrangements, and combinations of the parts that I shall hereinafter fully describe and claim.

For a full understanding of the invention, reference is to be had to the following description and accompanying drawings, in which, Figure 1 is an elevational view of my complete device with a portion broken away; Fig. 2 is a detail cross-sectional view on the line 2—2 of Fig. 1; and Fig. 3 is a detail perspective view of one of the wedge members.

Corresponding and like parts are referred to in the following description and designated in the accompanying drawings by like reference characters.

My improved collapsible core is composed of a plurality of separable sections which are segmental in form and tubular, and having enlarged flanges formed at their inner edges of rectangular form in cross section and connected with the main portion of the sections by reduced neck portions. In the present instance, four of these sections are employed, the same being designated 1, 2, 3, and 4, although it is to be understood that the invention is not limited in this respect.

The sections 1, 2, 3, and 4, are provided in one face of their flanges with longitudinal channels forming, when the sections are connected, an annular channel 5 to accommodate the ring 6. The abutting ends of the sections are provided with tapered openings 7 extending from the inner wall of the annular channel 5 to the opposite face of the sections, the inner ends of said tapered openings being larger than the outer ends, thereby forming openings for the tapered I-shaped connecting wedge members 8 adapted to be driven into said openings, the enlarged ends or heads of said wedge members being engaged in the large inner ends of the openings, securely fastening the sections together to form a complete core or mandrel for molding rubber tires and the like. The ring 6 is secured to the I-shaped connecting wedge members by screws 9 or the like extended through said ring and into the heads of the wedge members, whereby said wedge members are prevented from working out of the openings 7. The adjoining ends of the segmental members 1, 2, 3, and 4, are formed at their peripheral edges with registering recesses 10 designed to receive keys 11, to prevent sidewise movement of the segmental members at their outer or peripheral edges. The sections are also provided with inwardly directed recesses 12 adjacent the abutting ends of said sections, to receive the keys 13, similar to the keys 11 which serve to prevent sidewise or lateral movement of the inner edges of the segmental sections and also serve to assist the tapered I-shaped connecting wedge members 8 in retaining the segmental sections in proper position.

From the foregoing description in connection with the accompanying drawings, the operation of my improved collapsible core or mandrel will be apparent. In the practical use of the device, when setting up the core, the segmental sections are assembled with their ends abutting and the tapered I-shaped connecting wedge members 8 driven into the tapered openings 7, thereby producing a wedging action and a drawing or tensioning effect on the segmental members 1, 2, 3, and 4, and tending to bind them closely together in assembled relation. The keys 11 and 13 are then forced into their respective recesses to further lock together the segmental sections and prevent sidewise movement or displacement of the same, as above specified. The ring 6 may then be forced into the annular channel 5 and the screws 9 inserted to secure the ring 6 against the inner ends of the tapered I-shaped connecting wedge members 8. It will be understood that if desired, the tapered I-shaped connecting wedge members 8 and ring 6 may be secured together by the screws 9, before inserting the said tapered I-shaped wedge members 8, thereby making it possible to force the wedge members and ring into position with one operation. It will thus be seen that I have provided a very simple, durable, and efficient construction of collapsible core, wherein the parts are so arranged and formed that the operation of assembling or disassembling the parts may be easily effected and without the use of contracting rings or bolts.

While the accompanying drawing illustrates what I believe to be the preferred embodiment of my invention, it will be understood that the invention is not limited thereto, but that minor changes may be made in the construction, arrangement, and proportions of the parts without departing from the scope of the invention, as defined in the appended claims.

What I claim is:—

1. A collapsible core for manufacturing pneumatic tires comprising a plurality of separable segmental sections adapted to abut against each other to produce a circular body and provided at their inner edges with flanges, said flanges being provided with longitudinal channels in one face to form an annular channel when the sections are assembled, said flanges being also provided with tapered openings extending transversely from the annular channel at the ends of the sections, tapering wedge members adapted to be driven into the openings to draw the sections together, a ring adapted to be placed in the annular channel, and means for securing the ring to the tapering wedge members.

2. A collapsible core of the character described, comprising a plurality of separable segmental sections adapted to abut against each other to produce a circular body and provided at their inner edges with flanges, said flanges being provided in one face with longitudinal channels to form an annular channel when the sections are assembled and the flanges being also provided with tapered openings extending transversely from the annular channel at the ends of the sections and said openings being enlarged at their ends, tapering I-shaped wedge members adapted to be driven into the openings to draw the sections together, a ring receivable in the annular channel, and means for securing the ring to the tapering wedge members.

3. A collapsible core for pneumatic tires comprising a plurality of separable abutting sections producing a circular body, each section being provided at its edge with an enlarged flange connected with the main portion thereof by a neck portion and provided in one face with a longitudinal channel, whereby an annular channel will be provided when the sections are assembled, the adjoining ends of said flanges being provided with corresponding and communicating tapered openings in the ends of the longitudinal channels, the inner ends of the openings being larger than the remainder of said openings, tapered I-shaped wedge members adapted to be driven into the registering openings with the heads thereof lying in the enlarged inner ends of said openings to draw the sections together, a ring adapted to be forced into the annular channel and against the inner faces of the tapered I-shaped wedge members, and means for securing the ring to the tapered I-shaped wedge members.

4. A collapsible core of the character described comprising a plurality of segmental sections designed for abutting relation with each other whereby to form a circular body portion, said sections being formed with inwardly directed flanges producing an annular flange in the assembled relation of the sections, said flange being formed at the joint between the sections with transversely extending openings, wedge members receivable in said openings and adapted to overlap the joint, and a ring applicable to one side face of said annular flange and adapted to be secured to said wedge members for the purpose specified.

In testimony whereof I hereunto affix my signature in the presence of two witnesses.

JOHN YEMIKER.

Witnesses:
 C. A. STUEBGEN,
 H. O. SCHUMACHER.